United States Patent
Hoeven

(10) Patent No.: US 8,558,794 B2
(45) Date of Patent: Oct. 15, 2013

(54) TRACKBALL MODULE

(75) Inventor: Pieter Hoeven, Schijndel (NL)

(73) Assignee: Koninklijke Philips N.V., Eindhoven (NL)

( * ) Notice: Subject to any disclaimer, the term of this patent is extended or adjusted under 35 U.S.C. 154(b) by 201 days.

(21) Appl. No.: 13/133,154

(22) PCT Filed: Dec. 1, 2009

(86) PCT No.: PCT/IB2009/055430
§ 371 (c)(1),
(2), (4) Date: Jun. 7, 2011

(87) PCT Pub. No.: WO2010/067255
PCT Pub. Date: Jun. 17, 2010

(65) Prior Publication Data
US 2011/0241995 A1   Oct. 6, 2011

(30) Foreign Application Priority Data
Dec. 8, 2008 (EP) .................................. 08170916

(51) Int. Cl.
*G09G 5/08* (2006.01)
(52) U.S. Cl.
USPC ........................................................ 345/167
(58) Field of Classification Search
None
See application file for complete search history.

(56) References Cited

U.S. PATENT DOCUMENTS

| 5,253,836 | A |   | 10/1993 | Tso |
|---|---|---|---|---|
| 5,428,355 | A | * | 6/1995 | Jondrow et al. ................. 341/20 |
| 5,546,334 | A |   | 8/1996 | Hsieh et al. |
| 5,726,684 | A |   | 3/1998 | Blankenship et al. |
| 5,790,100 | A |   | 8/1998 | Kikinis |
| 6,091,404 | A |   | 7/2000 | Hong et al. |
| 6,369,798 | B1 | * | 4/2002 | Yatsu et al. ................... 345/167 |
| 7,126,586 | B2 |   | 10/2006 | Jianping et al. |
| 7,292,232 | B2 |   | 11/2007 | Ranta et al. |
| 2002/0190954 | A1 | * | 12/2002 | Chen ............................ 345/167 |
| 2005/0162390 | A1 |   | 7/2005 | Selby et al. |

FOREIGN PATENT DOCUMENTS

| EP | 0389679 A1 | 10/1990 |
|---|---|---|
| JP | 5307437 A | 11/1993 |
| WO | 2006043989 A1 | 4/2006 |

* cited by examiner

*Primary Examiner* — Jason Olson
(74) *Attorney, Agent, or Firm* — John F. Salazar; Mark L. Beloborodov

(57) ABSTRACT

A trackball module is provided for connecting a trackball to an electrical device, comprising a trackball for being manipulated by hand, a sensor device for detecting a turning of the trackball, a support device for positioning the trackball in a use position, in which the trackball is exposed for being manipulated, and a rest position, in which the trackball is adapted for being received by the electrical device, and an operating direction, which is defined roughly by a line through the center of the trackball and the center of a manipulating surface of the trackball exposed for turning the trackball by hand in the use position.

11 Claims, 7 Drawing Sheets

TRACKBALL MODULE

FIELD OF THE INVENTION

The invention relates to the field of trackball modules, which can be connected to a portable computer for entering orders by manipulating a trackball by hand.

BACKGROUND OF THE INVENTION

From U.S. Pat. No. 6,091,404 a trackball module is known, which comprises a trackball for being manipulated by hand and a sensor device for detecting a turning of the trackball arranged under the trackball. The trackball and the sensor device are received by a support device, which can be inserted into a portable computer and detached from the portable computer.

It is a disadvantage of such kind of a trackball module that the trackball module comprises a large height leading to a corresponding large height of an electrical device that uses such a kind of trackball module, such as a portable computer.

SUMMARY OF THE INVENTION

An object of the invention is to provide a trackball module that enables a thinner design of electrical devices, particularly portable computers.

This object is achieved by a trackball module for connecting a trackball to an electrical device, comprising a trackball for being manipulated by hand, a sensor device for detecting a turning of the trackball, a support device for positioning the trackball in a use position, where the trackball is exposed for being manipulated, and a rest position, where the trackball is adapted for being received by the electrical device, and an operating direction, which is defined roughly by a line through the center of the trackball and the center of a manipulating surface of the trackball exposed for turning the trackball by hand in the use position, wherein the support device is adapted to change the position of the sensor device with respect to the trackball so that the sensor device is arranged roughly along the operating direction for detecting the turning of the trackball in the use position and so that the sensor device is arranged offset in a direction perpendicular to the operating direction in the rest position with respect to the trackball.

Owing to the design of the support device the trackball and the sensor device can be arranged side by side in the rest position. Since in the rest position the trackball and the sensor device may be arranged in a roughly horizontal plane, the height of a portable computer or other electrical device is not defined by a roughly vertical arrangement of the trackball and the sensor device, but only by the maximum height of the trackball or the sensor device, so that the trackball module enables a thinner design of electrical devices, particularly portable computers. This means that in the use position the center of the trackball, the center of the manipulating surface of the trackball and the center of the sensor device may be arranged roughly in line with the operating direction. The operating direction corresponds roughly to the resulting force of the forces that are applied to the manipulating surface of the trackball during manipulation of the trackball. In particular the trackball is resilient in the operating direction for providing a click movement like clicking a computer mouse. Preferably the operating direction may be inclined with respect to the vertical for providing improved ergonomics for manipulating the trackball. Further the sensor device may be arranged vertically under the trackball, so that the sensor device is protected against sunlight by the trackball. This leads to an improved performance of the sensor device, when the sensor device detects the turning of the trackball optically. Furthermore the sensor device is able to detect the turning of the trackball in two different coordinate directions. Two different sensor devices for detecting each turning direction are not necessary. In particular the trackball and the sensor device may be arranged spaced apart from the electrical device leading to an arrangement in the use position where the space is not limited. A comfortable use of the trackball and an arrangement of the trackball module with reduced space in a thinner electrical device are possible at the same time.

In particular the support device is adapted to move the trackball and the sensor device between the use position and the rest position. The support device may provide a defined moving path of the trackball and the sensor device. An unwanted collision of the trackball or the sensor device with components of the electrical device may be avoided. Furthermore the trackball and the sensor device may stay connected to the electrical device even in the use position without the risk of getting lost. In particular the movement from the rest position to the use position may be performed automatically. For instance the support device may be spring-loaded in the rest position, so that after a release of the spring the trackball can be moved automatically into the use position. The spring may be loaded when the trackball is moved into the rest position by hand.

In a preferred embodiment a casing is provided for receiving the trackball and the sensor device and the casing is movable by means of the support device. A movement, meaning linear movement and/or turning, of the casing is sufficient for moving the trackball and the sensor device between the rest position and the use position. It is not necessary to provide a separate moving mechanism for the trackball on the one hand and the sensor device on the other hand. Particularly the relative movement of the sensor device sideways to the trackball out of the way of the operating direction is provided by turning the casing. The casing in particular turns around a pivot axis, which is arranged roughly perpendicular to the operating direction and which may or may not be positioned spaced apart from the operating direction.

In particular the casing is turnable through an angle $\alpha$, wherein the angle $\alpha$ is in particular $45° \leq \alpha \leq 190°$, preferably $60° \leq \alpha \leq 120°$ and most preferably $85° \leq \alpha \leq 95°$. The turning of the casing is in particular limited by stops, by which the casing may be positioned in the intended alignment for the rest position or the use position, so that only one additional linear movement is sufficient to finish the movement of the casing in the rest position or the use position. In particular a turning of the casing only, meaning without an additional linear movement, is sufficient for moving the casing between the rest position and the use position. For instance the casing may be turned by mainly $90° \pm 2°$, so that the sensor device may be positioned roughly in a vertical direction with respect to the trackball in the use position and roughly in a horizontal direction with respect to the trackball in the rest position.

Preferably the casing is split into at least a first receiving part for receiving the trackball and a second receiving part for receiving the sensor device, wherein the first receiving part and the second receiving part are movable with respect to each other, wherein in particular the first receiving part comprises an inclined first sliding surface and the second receiving part comprises an inclined second sliding surface, which is in contact with the first sliding surface during at least a part of the movement of the first receiving part with respect to the second receiving part. Owing to the split design it is possible to perform the intended relative movement of the sensor device with respect to the trackball by a linear movement only. For instance the first receiving part and the second receiving part may be moved towards each other for a movement in the use position and away from each other for a movement in the rest position. In particular the first receiving part and/or the second receiving part may be provided with a cleaning means such as a brush for cleaning the sliding surface(s) and/or the sensor device. Owing to the inclined sliding surfaces it is possible to position the sensor device and the trackball side by side roughly horizontally in the rest position. During the movement into the use position the sensor device can be moved under the trackball while the trackball is in addition moved upwards. Owing to the movement perpendicular to the direction of linear movement of the first receiving part to the second receiving part the trackball can protrude automatically from the electrical device in the use position. In the rest position the trackball may be fully received by the electrical device and may be not accessible but in the use position the trackball may be easily accessible for being manipulated by hand.

In particular the support device is adapted so that a part of the casing closes a release opening of the electrical device in the rest position. For instance only a bottom plane of the casing is visible in the rest position, wherein the bottom plane is particularly in the same plane as the surrounding parts of the electrical device. In the rest position the trackball and the sensor device may be protected against dirt and dust.

In a preferred embodiment the support device comprises a telescopic rail for a linear movement of the trackball and the sensor device. The telescopic rail may in particular be spring loaded for moving the trackball into the use position automatically, when the spring is released. Owing to the telescopic rail the trackball may be arranged spaced apart from the electrical device, which could be more comfortable for ergonomic reasons.

Preferably in the rest position a part of the trackball is exposed and adapted to release the support device by clicking the trackball for moving the trackball and the sensor device into the use position automatically. A part of the trackball may protrude from the electrical device in the rest position and be accessible from outside the electrical device. Owing to the exposed arrangement of the trackball it is possible to click the trackball, wherein this click can by detected by the support device and/or the electrical device. The click can be detected mechanically and/or by means of a distance sensor. The detected click in turn may lead to a release of the support device. In particular the support device may be spring loaded and the click of the trackball may release the support device, so that the trackball may be moved into the use position automatically.

In a preferred embodiment the trackball is connected to the support device so that in addition to the manipulating surface of the trackball at least one assist surface of the trackball is exposed in the use position for clicking and/or turning the trackball. Owing to the additional assist surface a further manipulation option is given. This can be helpful for adjusting the trackball module to a lefthander and/or to enable a different position of the hand of a user, which may be ergonomically advantageous. In particular it is possible to provide an additional clicking direction. For instance the trackball may be clickable in the operating direction and/or in an assist direction defined by a line through the center of the trackball and the center of the assist surface. The clicking of the trackball in the assist direction and/or in the operating direction can be detected by a distance sensor. Owing to the different clicking directions it is possible to enter additional orders into the electrical device via the same trackball.

This feature is in particular an invention on its own. This means the invention further relates to a trackball module for connecting a trackball to an electrical device, comprising a trackball for being manipulated by hand, a sensor device for detecting a turning of the trackball and an operating direction, which is defined roughly by a line through the center of the trackball and the center of a manipulating surface of the trackball exposed for turning the trackball by hand, wherein the trackball comprises an assist surface exposed for turning the trackball by hand and spaced apart from the manipulating surface, whereby in particular a clicking of the trackball along an assist direction, which is defined roughly by a line through the center of the trackball and the center of the assist surface, is enabled. In particular a support device for positioning the trackball in a use position, where the trackball is exposed for being manipulated, and a rest position, where the trackball is adapted for being received by the electrical device, is provided, wherein preferably the support device is adapted to change the position of the sensor device with respect to the trackball so that the sensor device is arranged roughly along the operating direction for detecting the turning of the trackball in the use position and so that the sensor device is arranged offset in a direction perpendicular to the operating direction in the rest position with respect to the trackball. This trackball module can be designed further as illustrated above and below.

In particular at least one distance sensor is provided for detecting a clicking of the trackball, wherein in particular the distance sensor is arranged roughly antipodal to the assist surface. The distance sensor is in particular arranged in line with the assist direction. Owing to the antipodal arrangement the distance sensor is covered by the trackball and protected against sunlight, so that the distance sensor may detect the distance optically.

Preferably the trackball is received by a casing, wherein the casing is shaped for exposing at least two different surfaces of the trackball bordered by the casing. Owing to the casing the shape of the manipulating surface and the shape of the assist surface can be defined. It is sufficient to move the casing into an intended position such as the use position for providing two different surfaces of the trackball for being manipulated and/or being clicked.

Most preferably the sensor device is adapted for detecting a rotation around a first rotation axis and/or a rotation around a second rotation axis and/or a distance of the trackball. In particular one sensor device is sufficient to detect all kinds of rotations of the trackball.

In a preferred embodiment the trackball is movable with respect to the sensor device along the operating direction, wherein the movement of the trackball with respect to the sensor device is in particular spring loaded. The trackball may be forced away from the sensor device by means of a spring or a plurality of springs, so that the trackball may abut a casing or the like in the use position. The trackball is accessible in the use position. In particular in the rest position the trackball may be pressed to the sensor device against the spring force, particularly until the trackball abuts the sensor device, so that the height in the operating direction can be reduced. In the use position a gap between the sensor device and the trackball is provided, which enables good detection of the movement of the trackball. In the rest position, when detection of the movement of the trackball is not necessary, the gap may be reduced to nearly zero for saving space.

This feature is particularly an invention of its own. This means the invention further relates to a trackball module for connecting a trackball to an electrical device, comprising a trackball for being manipulated by hand, a sensor device for detecting a turning of the trackball and an operating direction, which is defined roughly by a line through the center of the trackball and the center of a manipulating surface of the trackball exposed for turning the trackball by hand, whereby the trackball is movable with respect to the sensor device along the operating direction, wherein the movement of the trackball with respect to the sensor device is particularly spring loaded. In particular a support device for positioning the trackball in a use position, where the trackball is exposed for being manipulated, and a rest position, where the trackball is adapted for being received by the electrical device, is provided, wherein preferably the support device is adapted to change the position of the sensor device with respect to the trackball so that the sensor device is arranged roughly along the operating direction for detecting the turning of the trackball in the use position and so that the sensor device is arranged offset in a direction perpendicular to the operating direction in the rest position with respect to the trackball. This trackball module can be designed further as illustrated above.

The invention further relates to an electrical device, particularly a portable computer, comprising a trackball module for entering orders, which may be designed as previously described. Since the space requirement of the trackball module is reduced particularly in the rest position, the electrical device can be designed thinner. In particular a portable computer like a laptop may comprise a thinner height. The extension of the portable computer in vertical direction, when placed on a horizontal plane, can be reduced.

In particular a pivotable display is provided, wherein the display is connected to the support device so that opening the display forces the trackball into the use position. In particular the trackball is forced into the rest position during a closing of the display. The movement of the trackball may be performed by moving the display by hand without additional electrical power. Since the display is opened before using the electrical device like a laptop, the trackball is automatically in place when the electrical device is used. Since the display is closed after use, the trackball is automatically received by the electrical device in a space-saving manner without the need for moving the trackball by hand.

BRIEF DESCRIPTION OF THE DRAWINGS

These and other aspects of the invention will be apparent from and elucidated with reference to the embodiments described hereinafter.

In the drawings.

DETAILED DESCRIPTION OF EMBODIMENTS

Figure 1:
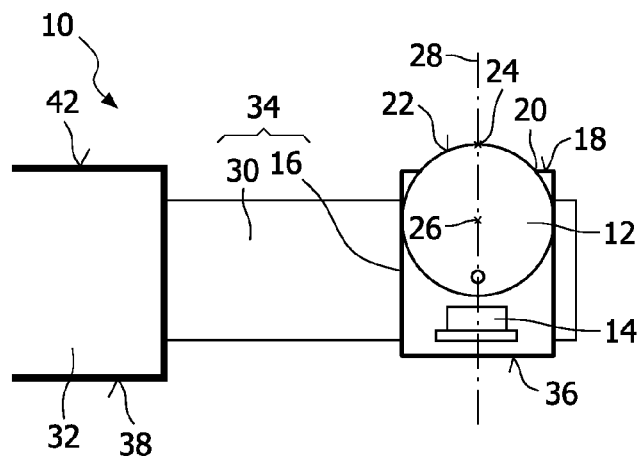
FIG. 1 is a schematic side view of a trackball module in the use position.

The trackball module 10 as illustrated in FIG. 1 comprises a trackball 12 and a sensor device 14, which are arranged in a casing 16. The casing 16 comprises an upper plane 18 with a manipulating opening 20. A part of the trackball 12 protrudes from the upper plane 18 of the casing 16 through the manipulating opening 20 and exposes a manipulating surface 22, with is bordered by the upper plane 18 at the manipulating opening 20. By means of a center 24 of the area of the exposed manipulating surface 22 and the center 26 of the trackball 12 an operating direction 28 is defined, which indicates the main direction of a resulting force of forces applied to the trackball 12 during use. In a lot of embodiments the operating direction 28 is roughly vertical. In the illustrated embodiment the sensor device 14 is arranged in line with the operating direction 28 facilitating the detection of the movement of the trackball 12.

The casing 16 is connected to a telescopic rail 30, by means of which the trackball 12 and the sensor device 14 can be moved in or out an electrical device 32. The casing 16 is rotatably connected to the rail 30 and forms together with the rail 30 a supporting device 34, by which the trackball module 10 is connected to the electrical device 32 and the trackball 12 can be moved between the illustrated use position, where the trackball 12 is exposed for being manipulated, and a rest position, where the trackball 12 is received by the electrical device 32. The casing is preferably designed so that in the use position a bottom plane 36 of the casing 16 is on the same level as a bottom 38 of the electrical device. When the electrical device is placed on an even substrate like a table, the bottom plane 36 is placed on the same substrate, so that applied forces in the operating direction 28 can be absorbed by the substrate without loading the rail 30 too much.

Figure 2:
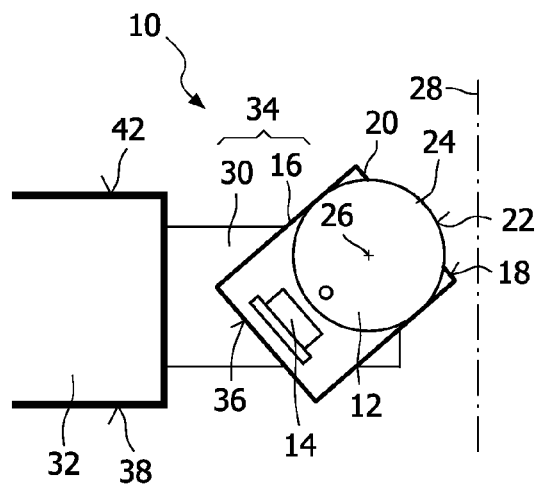
FIG. 2 is a schematic side view of the trackball module of FIG. 1 in an intermediate position.

In the embodiment illustrated in FIG. 1 the height of the trackball 12, the sensor device 14 and the casing 16 is greater than the height of the electrical device 32. For inserting the trackball 12 and the sensor device 14 in the electrical device 32 the casing 16 is turned with respect to the rail 30 as illustrated in FIG. 2. Owing to the turning of the casing 16 the sensor device 14 is arranged offset in a direction perpendicular to the operating direction 28. With respect to the arrangement of the sensor device 14 in the use position the sensor device 14 is moved and positioned spaced apart from the operating direction 28. In the illustrated embodiment the sensor device 14 is shifted horizontally with respect to the trackball 12. The turning of the casing 16 and the linear movement of the rail 30 can be performed subsequent or simultaneously.

Figure 3:
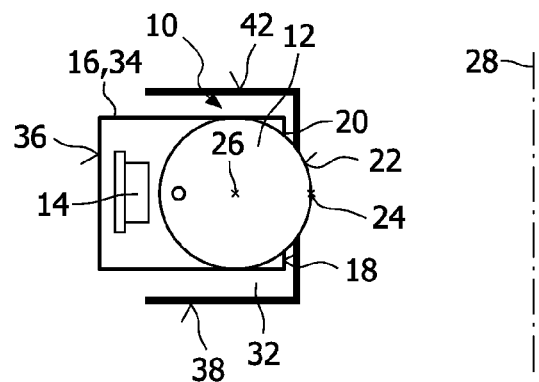
FIG. 3 is a schematic side view of the trackball module of FIG. 1 in the rest position.

In the rest position as illustrated in FIG. 3 the casing 16 is turned through approximately 90°. Since in this arrangement the sensor device 14 is placed side by side with the trackball 12 and not one upon the other anymore, the vertical height of the trackball module 10 is reduced. The trackball 12 and the sensor device 14 can be received by a comparatively thin electrical device 32 like a thin laptop. In the illustrated embodiment a part of the trackball 12 protrudes from the electrical device 32, so that it is still possible to click the trackball 12, for instance to release a spring-loaded rail 30 or the like. Alternatively the casing 16 may be arranged turned through 180°, so that the bottom plane 36 closes a not illustrated release opening of the electrical device 32.

Figure 4:
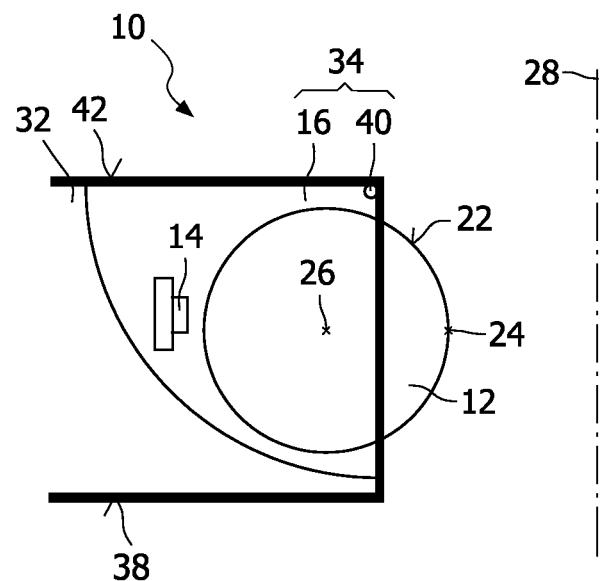
FIG. 4 is a schematic side view of a second embodiment of a trackball module in the rest position.
Figure 5:
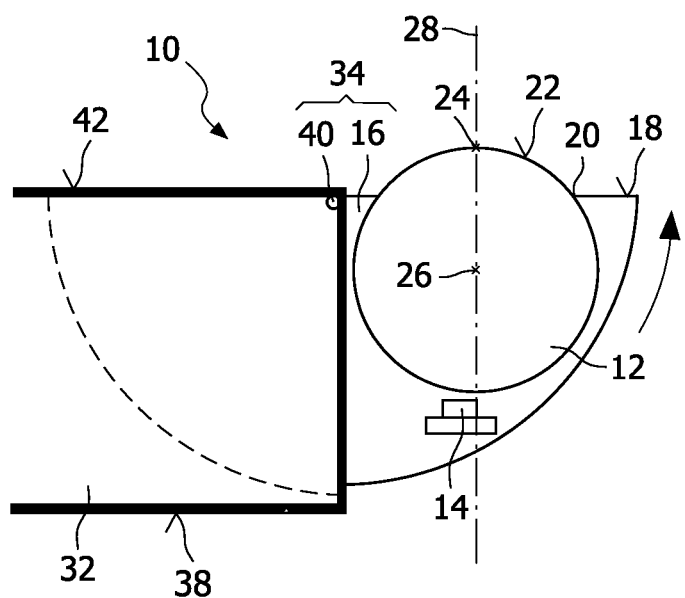
FIG. 5 is a schematic side view of the trackball module of FIG. 4 in the use position.

In the embodiment illustrated in FIG. 4 a rail 30 is omitted. The casing 16 is connected to the electrical device 32 directly via a hinge 40. The support device 34 is formed by the casing 16 and the hinge 40 and is capable of moving the trackball 12 between the rest position and the use position. In the illustrated rest position the trackball 12 may or may not protrude from the electrical device 32. In the use position as illustrated in FIG. 5 the casing 16 is pivoted at its outer side via the hinge 40 through approximately 90° compared with the rest position. Preferably the upper plane 18 is in mainly one plane as a top side 42 of the electrical device 32.

Figure 6:
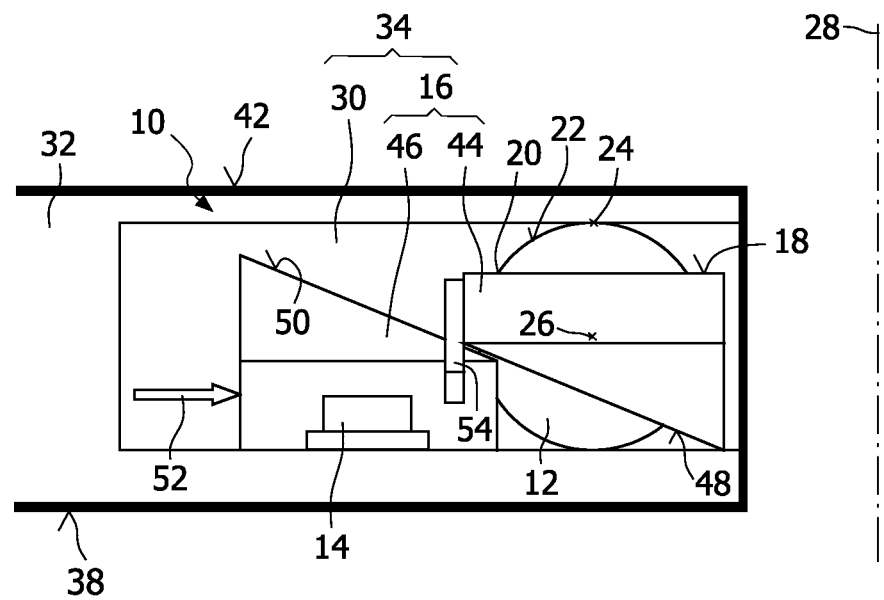
FIG. 6 is a schematic side view of a third embodiment of a trackball module in the rest position.
Figure 7:
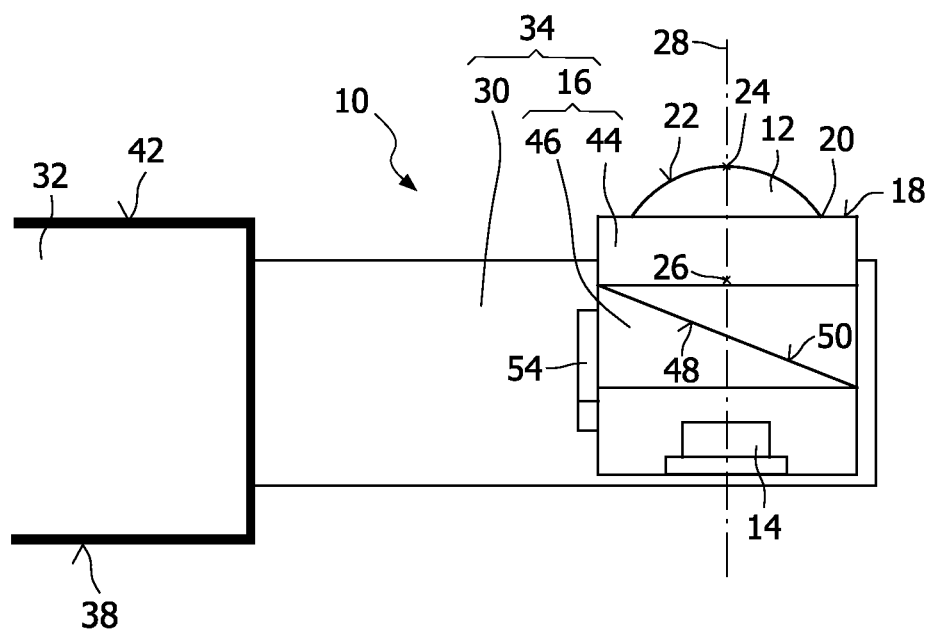
FIG. 7 is a schematic side view of the trackball module of FIG. 6 in the use position.

In the embodiment illustrated in FIG. 6 the trackball module 10 comprises a split casing 16 with a first receiving part 44 for receiving the trackball 12 and a second receiving part 46 for receiving the sensor device 14. In the illustrated embodiment the first receiving part 44 and the second receiving part 46 are positioned roughly horizontally side by side. The first receiving part 44 comprises a first sliding surface 48, wherein the second receiving part 46 comprises a corresponding second sliding surface 50. The first sliding surface 48 and the second sliding surface 50 are inclined. When the second receiving part 46 is moved linearly to the second receiving part 44 in the direction of an arrow 52, the first receiving part 44 is moved upwards owing to the inclined sliding surfaces 48, 50. In the use position as illustrated in FIG. 7 the sensor device 14 is positioned under the trackball 12 roughly in line with the operating direction 28. Owing to the telescopic rail 30 the trackball 12 is arranged spaced apart from the electrical device 32, so that a collision of the trackball 12 with components of the electrical device 32 is prevented. In the illustrated embodiment a cleaning means in the form of a brush 54 is provided for cleaning the sliding surfaces 48, 50 as well as the sensor device 14 during the movement of the receiving parts 44, 46.

Figure 8:
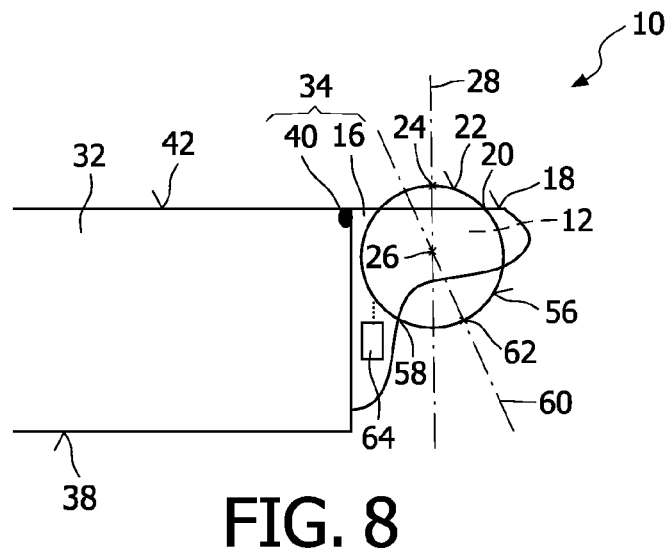
FIG. 8 is a schematic side view of a forth embodiment of a trackball module in the use position.

As illustrated in FIG. 8 the casing 16 of the trackball module 10 may be shaped so that, in addition to the manipulating surface 22, an assist surface 56 bordered by an assist opening 58 of the casing 16 is exposed for being manipulated. By means of the assist surface 56 the trackball 12 can be turned and/or clicked. The trackball is particularly clickable along an assist direction 60, which is defined mainly by a line through the center 26 of the trackball 12 and a center 62 of the area of the assist surface 56. The clicking of the trackball via the assist surface 56 may be detected by a distance sensor 64.

Figure 9:
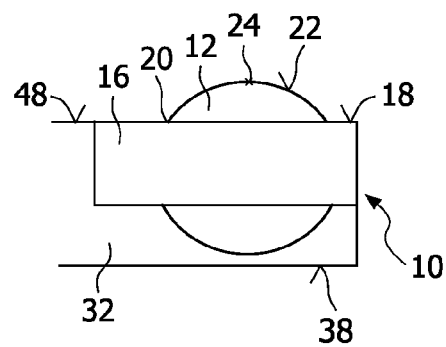
FIG. 9 is a schematic side view of a fifth embodiment of a trackball module in the rest position.
Figure 10:
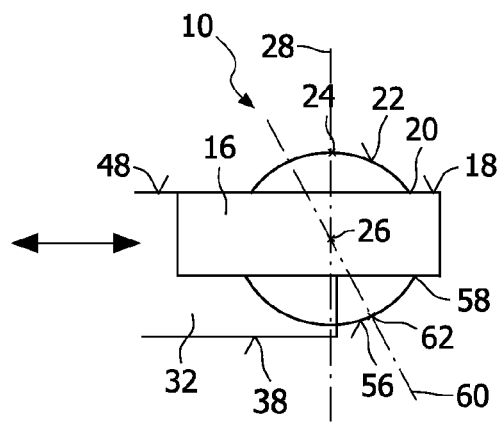
FIG. 10 is a schematic side view of the trackball module of FIG. 9 in the use position.

As illustrated in FIG. 9 the trackball 12 may be accessible in the rest position only via the manipulating surface 22. It is possible to click the trackball 12 via the manipulating surface 22 for releasing the trackball 12 and moving the trackball 12 in the use position as illustrated in FIG. 10 via a not illustrated telescopic rail 30. In the use position the assist surface 56 is exposed, which is in the illustrated embodiment bordered by the assist opening 58 of the casing 16 and the electrical device 32. The casing 16 may be horizontally split, so that the casing 16 may securely hold the trackball 12 at its maximum diameter.

Figure 11:
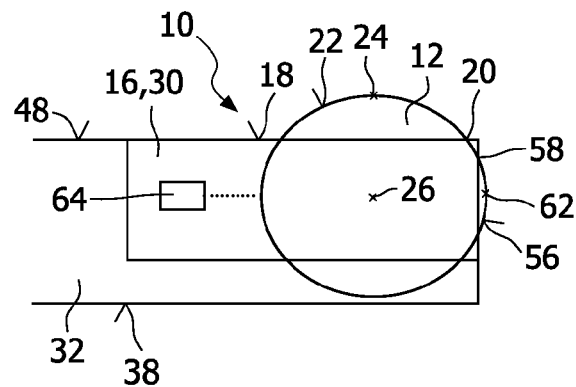
FIG. 11 is a schematic side view of a sixth embodiment of a trackball module.

As illustrated in FIG. 11 the assist surface 56 may be exposed even in the rest position. It is possible to click the trackball 12 via the assist surface 22 for releasing the trackball 12 and moving the trackball 12 in the use position via the telescopic rail 30. For detecting a clicking the trackball 12 via the assist surface 56 the distance sensor 64 is positioned antipodal with respect to the center 62 of the assist surface 56.

Figure 12:
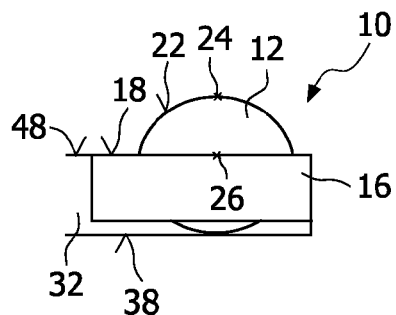
FIG. 12 is a schematic side view of a seventh embodiment of a trackball module in the rest position.
Figure 13:
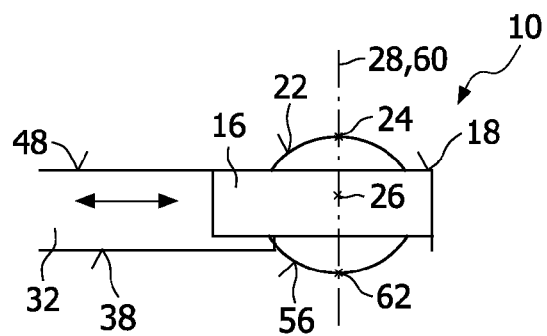
FIG. 13 is a schematic side view of the trackball module of FIG. 12 in the use position.

In the embodiment illustrated in FIG. 12 the trackball 12 comprises a larger manipulating surface 22 in the rest position than in the use position as illustrated in FIG. 13. In the use position the trackball may move downwards exposing the assist surface 56, which may be as large as the manipulating surface 22.

Figure 14:
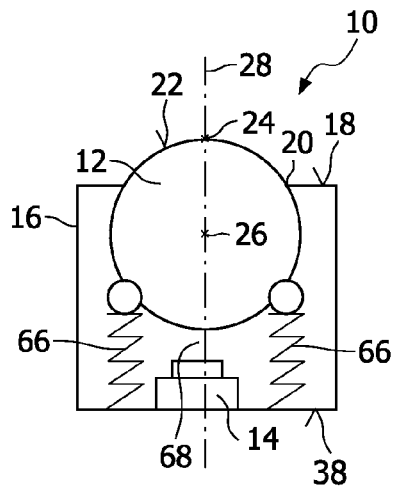
FIG. 14 is a schematic side view of an eighth embodiment of a trackball module in the use position.
Figure 15:
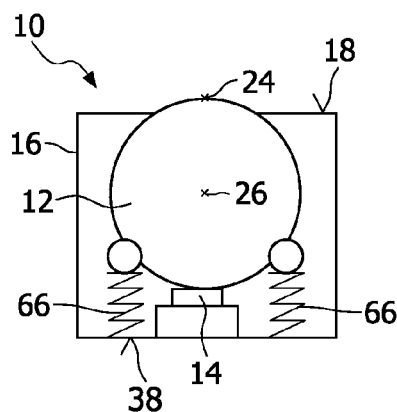
FIG. 15 is a schematic side view of the trackball module of FIG. 14 in the rest position.

In the embodiment illustrated in FIG. 14 the trackball 12 is connected via springs 66 to the bottom plane 36 of the casing 16. By means of the spring force of the springs 66 the trackball is held in the manipulating opening 20. A gap 68 is provided between the trackball 12 and the sensor device 14, so that the optical sensor device 14 may focus on the trackball 12. In the rest position as illustrated in FIG. 15 the trackball 12 is pressed against the spring force of the springs 66 until the trackball 12 abuts the sensor device 14. The gap 68 is eliminated so that the overall height is reduced in the rest position.

Figure 16:
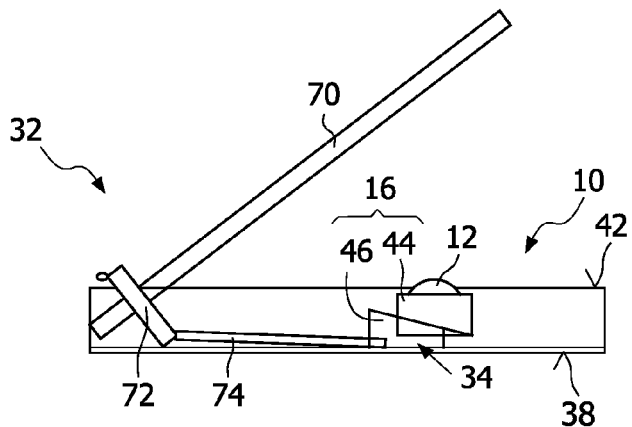
FIG. 16 is a schematic side view of a portable computer comprising a trackball module.

The electrical device 32 as illustrated in FIG. 16 is designed as a portable computer like a laptop. The electrical device comprises a pivotable display 70, which is connected to a lever 72. The lever 72 is connected via a link 74 to the support device 34 of the trackball module 10. In the illustrated embodiment the trackball module 10 is comparably designed as illustrated in FIG. 6 and FIG. 7. The link 74 is connected to the second receiving part 46 so that, in the rest position, when the display 70 is closed, the first receiving part 44 and the second receiving part 46 of the casing 16 are arranged roughly horizontally with respect to each other and, in the use position, when the display 70 is opened, the sensor device 14 of the second receiving part 46 and the trackball 12 of the first receiving part 44 are arranged roughly vertically with respect to each other.

Figure 17:
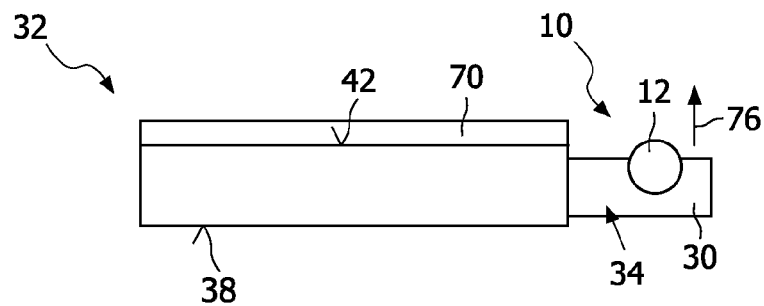
FIG. 17 is a schematic side view of a portable computer comprising a trackball module in a further embodiment.

In the embodiment illustrated in FIG. 17 the electrical device 32 in the form of a laptop comprises a trackball module 10, whose support device 34 comprises a telescopic rail 30. Even when the display 70 is closed, the trackball 12 may be accessible for manipulation, when the rail 30 moved the trackball 12 in the use position. The trackball 12 may be spring loaded, so that the trackball 12 may pop up from the rail 30 in a pop-up direction 76, when the rail 30 opens.

Figure 18:
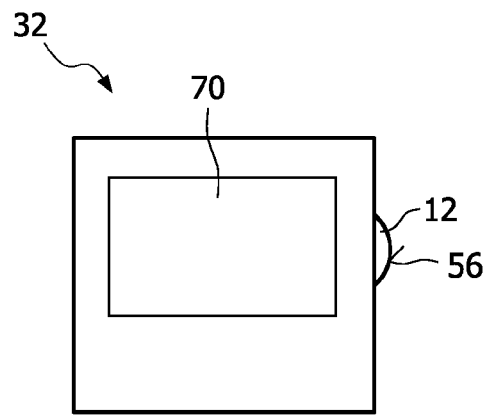
FIG. 18 is a schematic front view of an electrical device with the trackball module in the rest position and FIG. 19 is a schematic front view of the electrical device of FIG. 18 with the trackball module in the use position.
Figure 19:
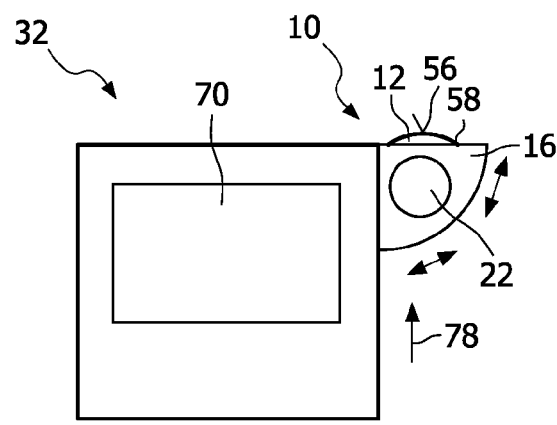

The trackball 12 of the electrical device 32 as illustrated in FIG. 18 is only partially received by the electrical device 32, so that only the assist surface 56 is exposed. After clicking the trackball 12 via the assist surface 56 the trackball 12 moves into the use position as illustrated in FIG. 19. The trackball 12 is pivoted outside the electrical device 32 via the pivotable casing 16. In the illustrated embodiment the casing 16 is moved in addition longitudinal with respect to the electrical device 32 in a direction 78. In the use position the manipulating surface 22 is exposed for turning and/or clicking the trackball 12. If so, the trackball 12 may be spring loaded as illustrated in FIG. 17. The position of the not illustrated sensor device 14 may be changed as illustrated in FIG. 4 and FIG. 5 and/or in FIGS. 1 to 3.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. For example the spring-loaded trackball 12 may be replaced by a trackball 12 that is moved electrically by means of a motor or the like. Furthermore a mechanism may be provided to move the trackball 12 manually from outside the trackball module 10. In particular the sensor device 14 may be turned around more than one turning axis, for instance around two particularly perpendicular turning axis, and/or shifted in more than one direction, for instance along two particularly perpendicular shifting directions. A turning of the trackball 12 and/or the casing 16 may be provided clockwise or counterclockwise. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A trackball module for connecting a trackball to an electrical device, the trackball module comprising
a trackball configured for being manipulated by hand,
a sensor device for detecting a turning of the trackball,
a casing having a first receiving part for receiving the trackball, the first receiving part comprising an inclined first sliding surface and a second receiving part for receiving the sensor device, the second receiving part comprising an inclined second sliding surface and
a support device for positioning the trackball in a use position, in which the trackball is exposed for being manipulated, and a rest position, in which the trackball is adapted for being received by the electrical device, and having an operating direction defined substantially by a line through the center of the trackball and the center of a manipulating surface of the trackball exposed for turning the trackball by hand in the use position,
wherein the casing is movable by means of the support device, the first receiving part and the second receiving part are movable with respect to each other, the inclined second sliding surface is configured to be in contact with the first sliding surface during at least a part of the movement of the first receiving part with respect to the second receiving part, and the support device is configured to change the position of the sensor device with respect to the trackball so that the sensor device is arranged
mainly along the operating direction for detecting the turning of trackball in the use position and
offset in a direction generally perpendicular to the operating direction in the rest position with respect to the position of the trackball.

2. The trackball module according to claim 1, wherein the support device is configured to move the trackball and the sensor device between the use position and the rest position.

3. The trackball module according to claim 1, wherein the casing is turnable through an angle α, wherein the angle α is $45° \leq \alpha \leq 190$.

4. The trackball module according to claim 1, wherein the support device is configured so that a part of the casing closes a release opening of the electrical device in the rest position.

5. The trackball module according to claim 1, wherein the support device comprises a telescopic rail for a linear movement of the trackball and the sensor device.

6. The trackball module according to claim 1, wherein in the rest position a part of the trackball is exposed and configured to release the support device by clicking the trackball for moving the trackball and the sensor device in the use position automatically.

7. The trackball module according to claim 1, wherein the trackball is connected to the support device so that in addition to the manipulating surface of the trackball at least one assist surface of the trackball is exposed in the use position for clicking and/or turning the trackball.

8. The trackball module according to claim 7, wherein at least one distance sensor is provided for detecting a clicking of the trackball, wherein the distance sensor is arranged roughly antipodal to the assist surface.

9. The trackball module according to claim 7, wherein the trackball is received by a casing, wherein the casing is shaped for exposing at least two different surfaces of the trackball bordered by the casing.

10. The trackball module according to claim 1, wherein the sensor device is configured for detecting a rotation around a first rotation axis and/or a rotation around a second rotational axis and/or a distance of the trackball.

11. The trackball module according to claim 1, wherein the trackball is movable with respect to the sensor device along the operating direction, wherein the movement of the trackball with respect to the sensor device is in particular spring loaded.

* * * * *